United States Patent
Golds (10) Patent No.: US 8,543,130 B2
(45) Date of Patent: Sep. 24, 2013

(54) INTELLIGENT GLOBAL POSITIONING SYSTEM (GPS) INFORMATION DETECTION

(75) Inventor: David Golds, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 12/040,862

(22) Filed: Feb. 29, 2008

(65) Prior Publication Data

US 2009/0054078 A1    Feb. 26, 2009

Related U.S. Application Data

(60) Provisional application No. 60/968,004, filed on Aug. 24, 2007.

(51) Int. Cl.
*H04W 24/00* (2009.01)

(52) U.S. Cl.
USPC ............. 455/456.1; 455/456.2; 455/456.3; 455/456.4; 342/357.21; 701/400

(58) Field of Classification Search
USPC ............ 455/456.1–456.6, 3.02, 161.3, 181.1, 455/404.2, 440; 342/357.2–357.78; 701/200–226, 400–425
See application file for complete search history.

(56) References Cited

U.S. PATENT DOCUMENTS

| | | | |
|---|---|---|---|
| 5,598,166 A | | 1/1997 | Ishikawa et al. |
| 6,167,268 A | * | 12/2000 | Souissi et al. ................ 455/434 |
| 7,031,711 B2 | | 4/2006 | Soliman |
| 7,176,831 B2 | | 2/2007 | Dibble et al. |
| 7,236,770 B2 | | 6/2007 | Sankaramanchi |
| 7,240,095 B1 | | 7/2007 | Lewis |

(Continued)

FOREIGN PATENT DOCUMENTS

WO    2007001660 A2    1/2007

OTHER PUBLICATIONS

Bahl, Paramvir, et al., "User Location and Tracking in an In-Building Radio Network," available at http://research.microsoft.com/~padmanab/papers/msr-tr-99-12.pdf, Feb. 1999, 13 pages.

(Continued)

*Primary Examiner* — Kamran Afshar
*Assistant Examiner* — Marisol Fahnert
(74) *Attorney, Agent, or Firm* — Senniger Powers LLP (57) ABSTRACT

Intelligently caching global positioning system (GPS) location information from GPS satellites based on cellular radio signal strength received at a portable device. The GPS satellites broadcasts signals to the portable device and the cellular radio signal strength is at a first level indicative of a low GPS reception strength. A second level, at the portable device, of the cellular radio signal strength is detected, and the second level is indicative of an increase in GPS reception strength. GPS location information is speculatively read from the GPS satellites associated with the portable device in response to the detected second level and the increase of the GPS reception strength. The GPS location information is cached on the portable device such that the GPS location information is available to the portable device when the first level of the cellular radio signal strength is less than the second level.

9 Claims, 4 Drawing Sheets

(56) References Cited

U.S. PATENT DOCUMENTS

| | | |
|---|---|---|
| 2002/0137530 A1 | 9/2002 | Karve |
| 2003/0231704 A1* | 12/2003 | Tanaka et al. ............ 375/150 |
| 2005/0064883 A1 | 3/2005 | Heck |
| 2006/0003741 A1 | 1/2006 | Becker et al. |
| 2006/0046709 A1 | 3/2006 | Krumm et al. |
| 2006/0183465 A1 | 8/2006 | Helferich |
| 2006/0194571 A1 | 8/2006 | Bossemeyer et al. |
| 2006/0217131 A1 | 9/2006 | Alizadeh-Shabdiz et al. |
| 2007/0010241 A1 | 1/2007 | Wachter et al. |
| 2007/0026871 A1* | 2/2007 | Wager ................ 455/456.1 |
| 2007/0188382 A1 | 8/2007 | Shin et al. |
| 2007/0200862 A1* | 8/2007 | Uchiyama et al. ........ 345/564 |

OTHER PUBLICATIONS

Biswas, Prabuddha, et al., "Location Caching in the Mobile Middleware Platform," available at http://66.102.1.104/scholar?hl=en&lr=&q=cache:Gk7Vv4es7nUJ:computer.org/proceedings/mdm/1500/15000172.pdf+, printed on Sep. 12, 2007, 3 pages.

Hightower, Jeffrey, et al., "SpotON: An Indoor 3d Location Sensing Technology Based on RF Signal Strength," http://seattle.intel-research.net/people/jhightower/pubs/hightower2000indoor/hightower2000indoor.pdf, Feb. 18, 2000, 16 pages.

* cited by examiner

INTELLIGENT GLOBAL POSITIONING SYSTEM (GPS) INFORMATION DETECTION

CROSS REFERENCE OF RELATED APPLICATION

This application is a non-provisional of U.S. Provisional Patent Application Ser. No. 60/968,004, filed Aug. 24, 2007, the entire text of which is hereby incorporated by reference.

BACKGROUND

Personal computer (PC) social networks have now become mainstream, and mobile social networks are emerging. Particularly in mobile social networks, the applications and software (collectively referred to as "application layer") that drive the versatility and robustness of the mobile social networking are based on having an accurate and up-to-date global positioning system (GPS) location. While in most instances GPS reception is ubiquitous, there are locations where GPS readings are not possible if users are indoors or inside a structure where the reception is weak or unavailable. With the absence of a valid GPS location, the application that depends on a GPS location information is unable to function effectively.

For example, when a mobile or portable device experiences weak or unavailable cellular radio signal strength, the mobile or portable device is unable to properly read GPS location information from the satellites. For instance, a user of the mobile device capable of receiving the GPS location information moves from a first building to a second building. During part of this travel time, the user is outdoor, and the portable device experiences increased cellular radio signal strength. During this increase, however, the mobile or portable device fails to recognize the opportunity available for the user to read or obtain the GPS location information during this short period of time.

SUMMARY

Embodiments of the invention enhance reading of the GPS location information by detecting an increase in the cellular radio signal strength on a mobile phone before forcing a speculative reading of the GPS location information. As such, aspects of the invention use small windows of opportunity when radio signals are available to explicitly do a few immediate GPS location reads. Furthermore, embodiments of the invention cache the GPS location read during the small windows of opportunity in order to make it available to applications that depend on GPS location information. This advantage enhances and improves in the scenarios where mobile users are in transition between locations and there is brief signal strength to do a GPS lookup while unable to stop to wait for a GPS read based on a time interval pre-determined or preset by the mobile device.

Alternative embodiments further detect and track the GPS location staleness or a low level of cellular radio signal strength so that an increase of the cellular radio signal strength can be quickly detected.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
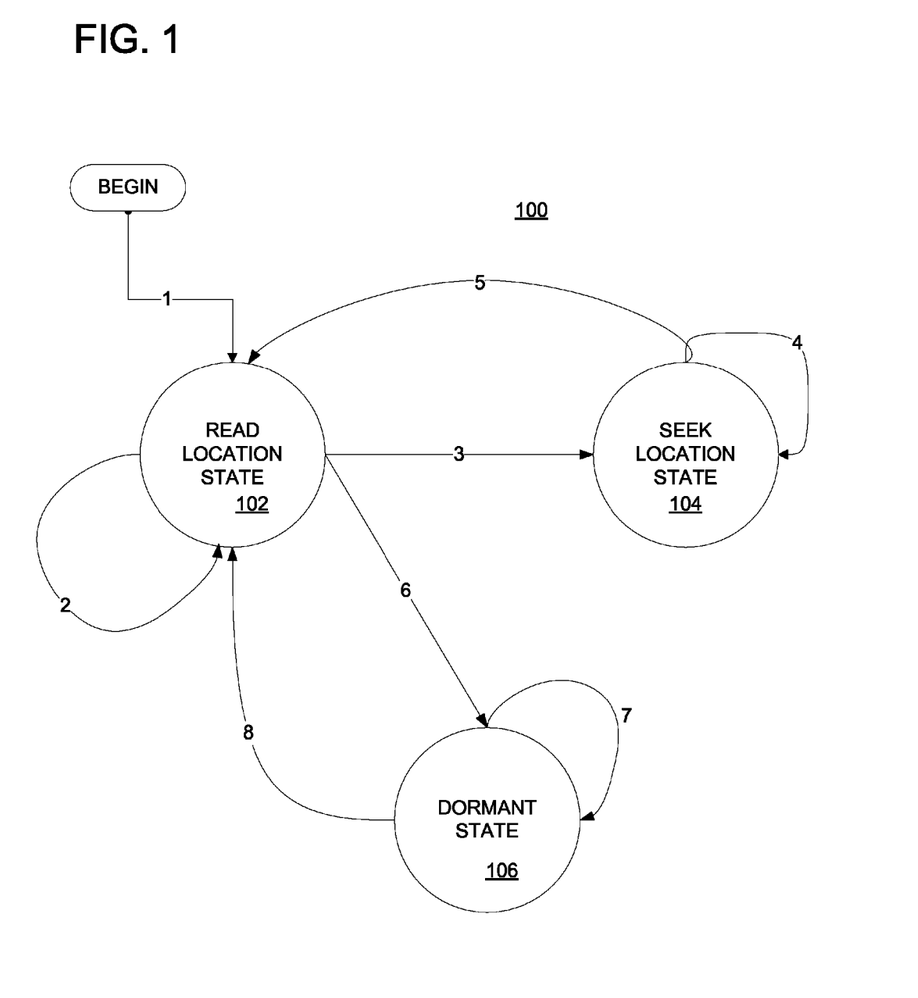
FIG. 1 is an exemplary embodiment of a state diagram illustrating detecting an increase of cellular radio signal strength and caching of GPS location information according to an embodiment of the invention.

In illustrating embodiments of the invention, FIG. 1 describes a state diagram 100 illustrating detecting an increase of cellular radio signal strength and caching of GPS location information according to an embodiment of the invention. It is to be understood that additional states may be added without departing from the scope of this invention.

The state diagram 100 starts by entering a GPS system to a state 102 as depicted by an arc 1. For example, the GPS system defines an area where GPS signals are available. It is to be understood that other types of wireless transmission medium, such as radio wave, or the like may be used without departing from the scope or spirit of embodiments of the invention. In the state 102 indicating "Read Location State," a GPS reception system is actively trying to identify the GPS location information. In one example, the system performs a few speculative GPS reads at a specified interval of 30 seconds as depicted by an arc 2. In one embodiment, the speculative GPS read is triggered by a timer that is activated if the GPS location is stale and when cellular radio signal strength threshold makes this reading possible.

If the GPS system has tried to do a few speculative GPS reads and failed, the GPS system first moves to a state 104 indicating "Seek Location State" as depicted by an arc 3. In addition, the GPS system at the state 104 monitors the cellular radio signal strength as depicted by an arc 4. Furthermore, the GPS system detects whether the cellular radio signal strength has increased and moves to the state 102 as depicted by an arc 5. At this time, the GPS location cache is set to stale. In an alternative embodiment, a timer is used at the state 104 such that the GPS system does not constantly monitoring and/or detecting an increase in the cellular radio signal strength.

If the GPS read is not possible due to weak radio signal strength or the timer threshold has exceeded after speculative reading, the GPS system moves to a state 106 indicating "Dormant State" as depicted by an arc 6. In one embodiment, the GPS system stays at the state 106 for a predetermined dormancy period (e.g., 30 minutes) until the radio signal is once again below the threshold or if the dormancy period is over.

In addition, at the state 106, the GPS system was able to successfully read the current GPS location and cached the GPS location information on the portable or mobile device."

The location is not stale based on the timestamp associated with each location stored. The dormancy timer is set based on the dormant sleep time (e.g., 30 minutes) as depicted by an arc 7. The GPS system may enter the state 102 to try again after the time is elapsed as depicted by an arc 8.

Figure 2:
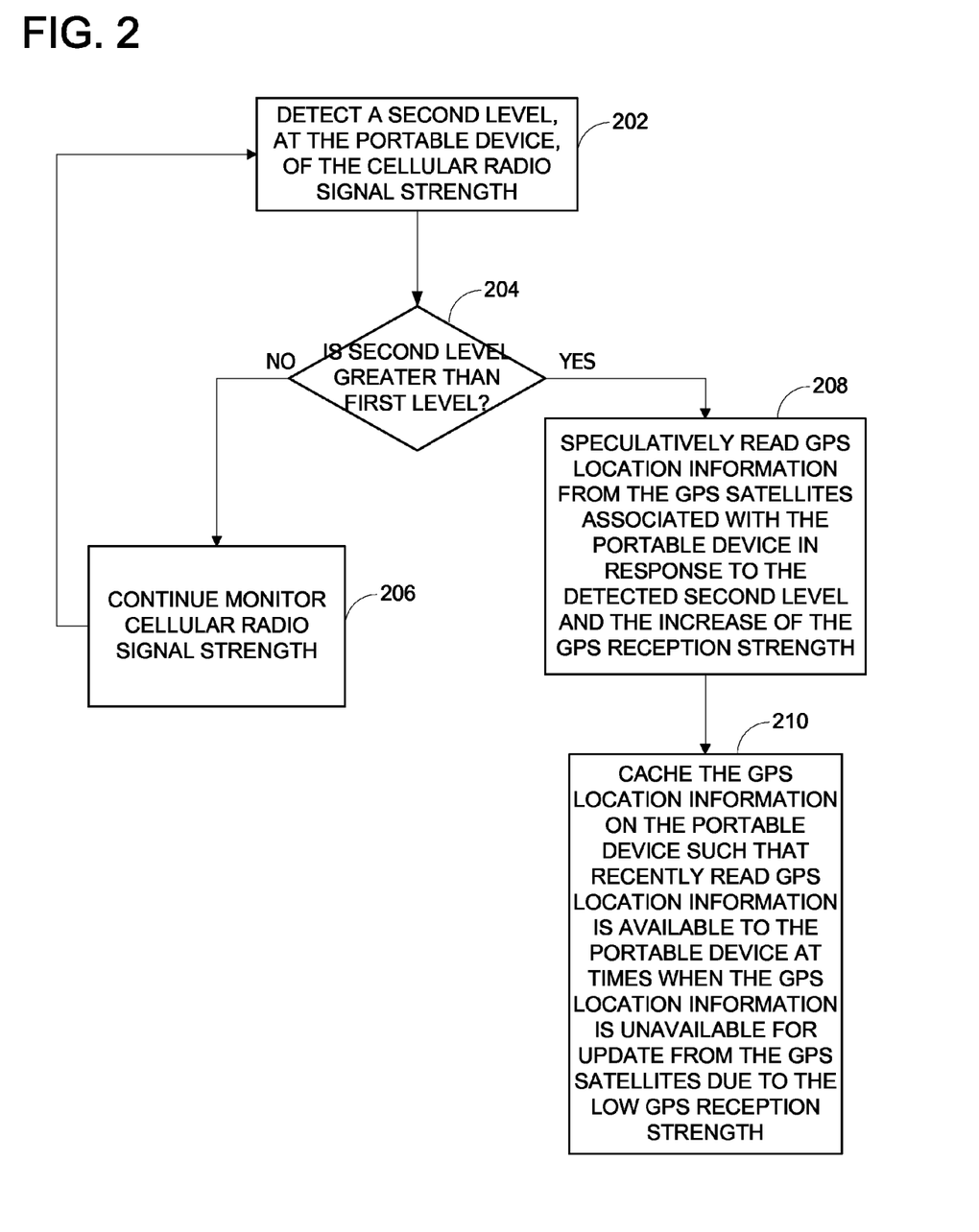
FIG. 2 is a flow diagram illustrating operations for detecting an increase of cellular radio signal strength and caching of GPS location information according to an embodiment of the invention.

FIG. 2 illustrates a flow diagram illustrating operations for detecting an increase of cellular radio signal strength and caching of GPS location information according to an embodiment of the invention. Initially, the GPS system is receiving a cellular radio signal strength at a first level which indicates a low level of the cellular radio signal strength and a low GPS reception strength. At 202, a second level of the cellular radio signal strength at the portable device is detected. The second level may be indicative of an increase in the GPS reception strength. At 204, it is determined whether the second level is greater than the first level. If the determination is negative, the cellular radio signal strength is monitored at 206.

On the other hand, if the determination is positive, the GPS location information is speculatively read from the GPS satellites associated with the portable device in response to the detected second level and the increase of the GPS reception strength at 208. The GPS location information is cached on the portable device such that the GPS location information is available to the portable device when the first level of the cellular radio signal strength is less than the second level at 210.

Alternative embodiments of the invention monitor the cellular radio signal strength and/or the GPS reception strength. For example, aspects of the invention may actively monitor the cellular radio signal strength and/or the GPS reception strength for a pre-determined period of time. The monitored information may be temporarily stored on a memory of the device and the information may be removed or erased after another pre-determined period of time has lapsed.

Figure 3:
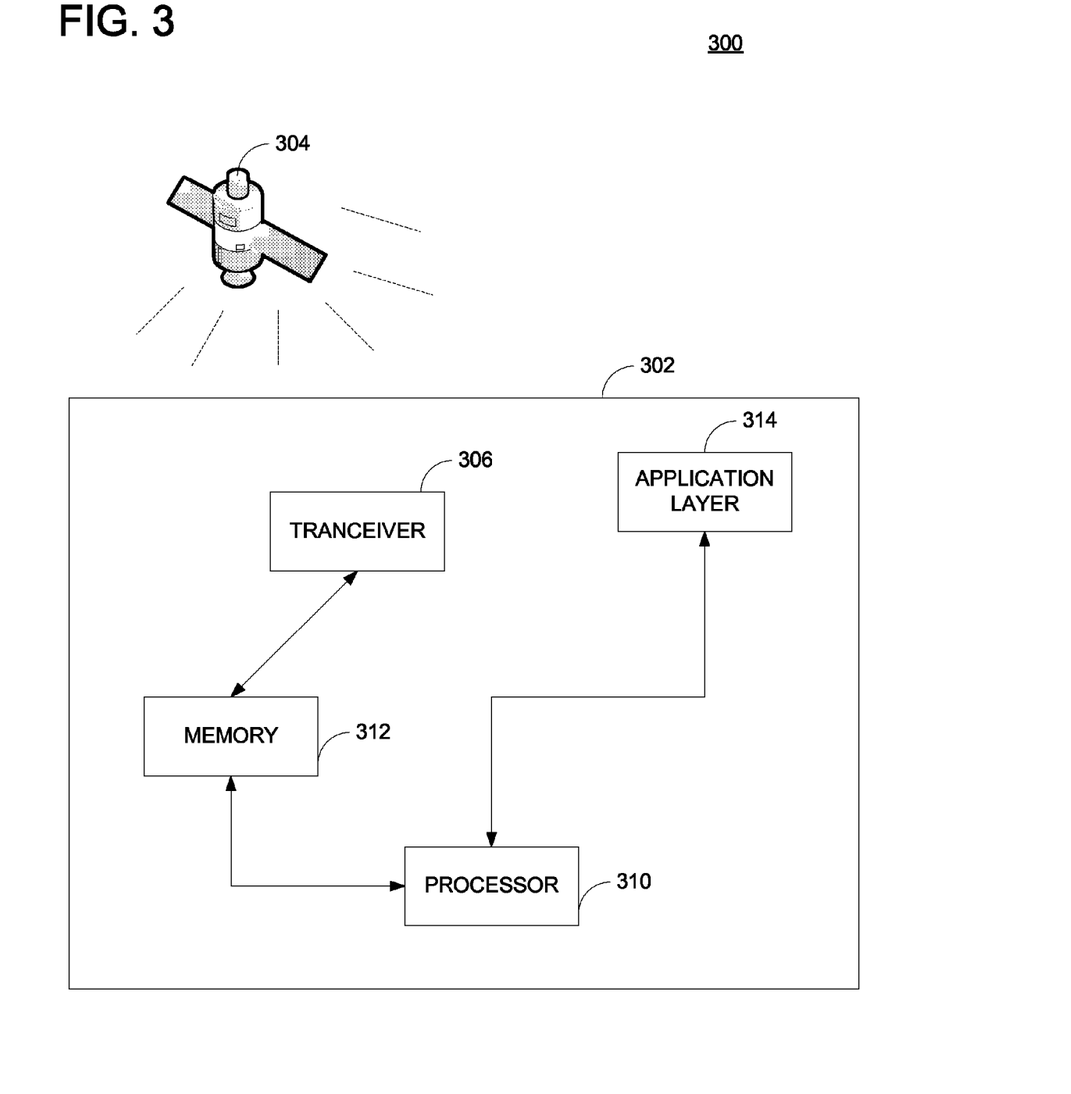
FIG. 3 is a block diagram illustrating a system for intelligently caching global positioning system (GPS) location information on a portable device according to an embodiment of the invention.

FIG. 3 illustrates a diagram showing a system 300 for intelligently caching global positioning system (GPS) location information on a portable device according to an embodiment of the invention. In one example, the system 300 may be a computing system incorporated in a portable device 302, such as a mobile device, a portable device, a personal digital assistant (PDA) or the like. In one embodiment, the system 300 may include the computer 130 in FIG. 4. The portable device 302 is configured for receiving signals broadcast by a GPS satellite, such as GPS satellite 304. The system 300 includes a transceiver 306 adapted for receiving and transmitting signals from the GPS satellite 304. The system 300 also includes a processor 310 having configured to execute computer-executable instructions for determining an increase in the GPS satellite signal strength received from the GPS satellite via the transceiver 306 from a first level to a second level. The second level corresponds to at least a minimum signal strength for determining the location of the portable device 302. The processor 310 reads or identifies a current location of the portable device 302 in response to the determined increase in signal strength to the second level as received at the portable device. The system 300 also includes a memory 312 for caching, on the portable device 302, the read current location information of the portable device 302.

In one embodiment, after a time period has lapsed, the transceiver 306 may next unable to receive signals from the GPS satellite 304 at a next location. As such, the processor 310 may retrieve the read location information from the memory at the next location and providing the read current location information. In one embodiment, the system 300 may also have an application layer 314 which collective represents a collection of software or application that uses the GPS information. For example, the application layer 314 may include software that requires the GPS information for providing utilities to a user. As such, when the GPS information is unable to the application layer, the processor 310 may retrieve the stored or cached GPS information for the application layer.

In operation, aspects of the invention is available in situations where a user of a GPS portable system is traveling or moving from locations where intermittent lost of cellular radio signal strength is experienced. It is understood that embodiments of the invention are not limited by the illustrated example. For example, the user is initially in a first building where no GPS read can be accomplished. At this time, the GPS location information may be unavailable to the user from the cache of the GPS portable system and any GPS-dependent applications are unable to function properly. As the user moves from the first building to the second building, the GPS portable system detects an increase in the cellular radio signal strength and immediately or substantially immediately performs a speculative GPS reading operation of the GPS location information from the GPS satellites. During this short window of opportunity, the intelligent GPS detection and caching of embodiments of the invention read the GPS location information and cache the GPS location information on the portable device. At this time, the user has arrived at a second building where the cellular radio signal strength is again low or weak (i.e., no GPS read can be achieved). However, based on the cached GPS location information stored as a result of detecting the increase in cellular signal strength, the GPS-dependent applications can once again be available.

Figure 4:
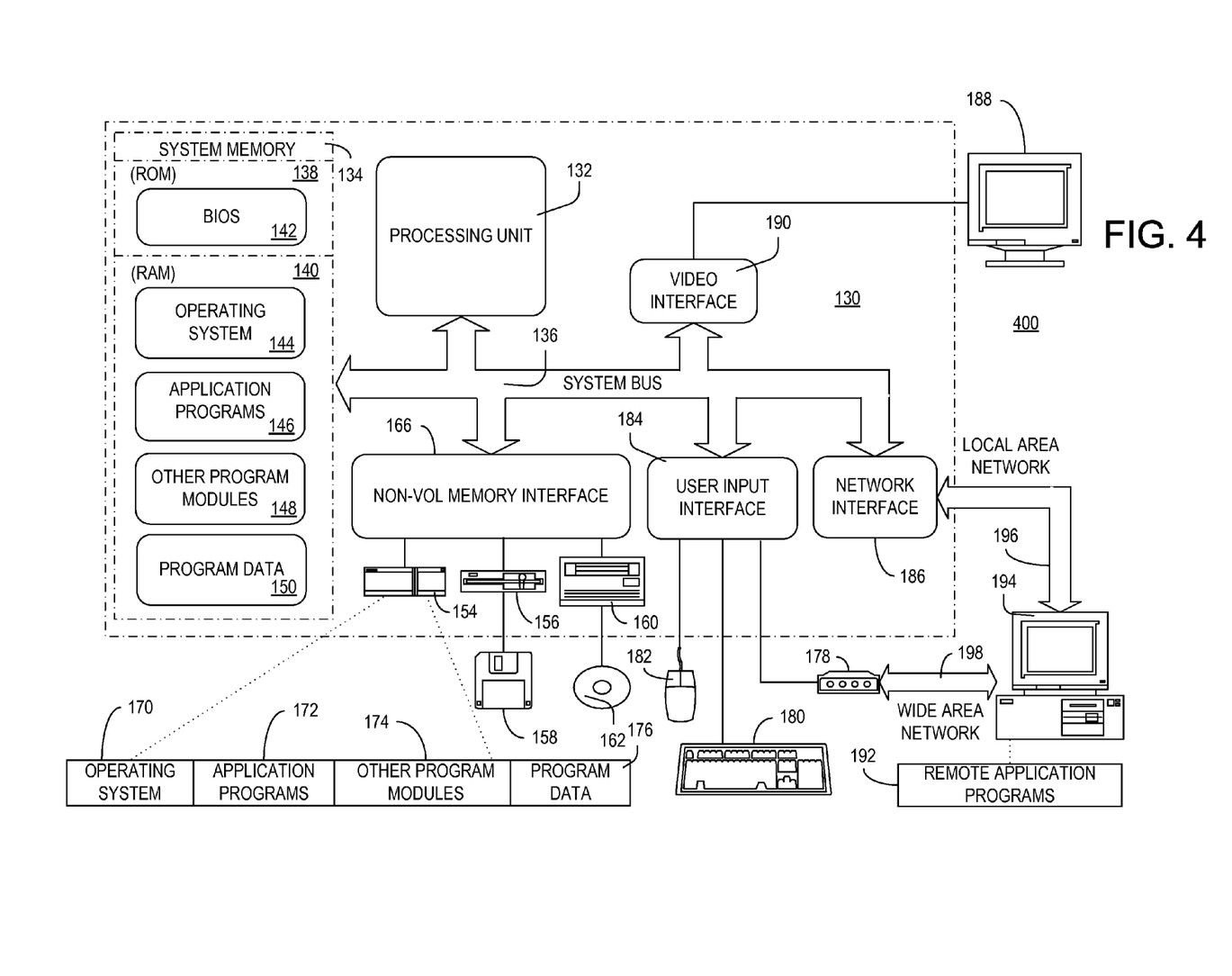
FIG. 4 is a block diagram illustrating one example of a suitable computing system environment in which the invention may be implemented.

FIG. 4 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. Byway of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for intelligently caching global positioning system (GPS) location information from GPS satellites, wherein the GPS satellites broadcast GPS signals to a portable device, said portable device receiving broadcasted signals as a function of a cellular radio signal strength, wherein the cellular radio signal strength is initially at a first level indicative of a low GPS signal reception strength, said method comprising:

detecting a second level of the cellular radio signal strength at the portable device, said second level indicative of an increase in GPS reception strength when the second level is greater than the first level;

when the second level is greater than the first level:
        activating a timer when GPS location information is determined to be stale;
        speculatively reading GPS location information from the GPS satellites associated with the portable device in response to the timer when the GPS reception strength increases, wherein the reading occurs within a pre-set time interval; and
        storing the read GPS location information on the portable device;

when the second level is less than or equal to the first level:
        activating a timer, said timer deactivating the detecting; and
        permitting access, by the portable device, to the stored GPS location information;

providing a timestamp to the stored GPS location information on the portable device; and     removing the stored GPS location information on the portable device after a pre-determined period of time has lapsed with respect to the timestamp.

2. The method of claim 1, wherein detecting comprises detecting the GPS signal reception strength in response to the timer.

3. A system for intelligently caching global positioning system (GPS) location information on a portable device, said portable device being configured for receiving signals broadcast by a GPS satellite and determining a location of the portable device as a function thereof, said system comprising:

a transceiver adapted for receiving and transmitting signals from the GPS satellite;

a processor configured to execute computer-executable instructions for:
  determining an increase in the GPS satellite signal strength received from the GPS satellite via the transceiver from a first level to a second level, said second level corresponding to at least a minimum signal strength for determining the location of the portable device;
  determining when the GPS location information is stale;
  reading a current location of the portable device in response to the determined increase in the GPS signal strength to the second level as received at the portable device and the GPS location information being stale, wherein the reading occurs within a pre-set time interval; and
a memory for caching, on the portable device, the read current location information of the portable device based on a timestamp of the read current location information provided by the processor;
wherein the processor is configured to monitor the GPS satellite signal strength from the first level to the second level and wherein the memory stores the monitored GPS satellite signal strength information, wherein the memory removes the monitored GPS satellite signal strength information after a pre-determined period of time has lapsed; and
wherein the processor is further configured to retrieve the read location information from the memory when the transceiver is unable to receive signals from the GPS satellite at a next location and to provide the read current location information.

4. The system of claim 3, wherein the processor is further configured to activate a timer if the second level is less than or equal to the first level, wherein the timer deactivates determining.

5. The system of claim 4, wherein the processor is configured to speculatively read the GPS location information in response to the timer.

6. The system of claim 3, wherein the processor determines the monitored GPS satellite signal strength from the first level to the second level, said second level corresponding to at least the minimum signal strength for determining the location of the portable device.

7. A method for intelligently caching global positioning system (GPS) location information from GPS satellites, wherein the GPS satellites broadcasting GPS signals to a portable device, said portable device receiving broadcasted signals as a function of a cellular radio signal strength, wherein the cellular radio signal strength is initially at a first level indicative of a low GPS signal reception strength, said method comprising:
  determining when the GPS location information is stale;
  monitoring the cellular radio signal strength at the portable device;
  detecting a second level of the monitored cellular radio signal strength at the portable device, said second level indicative of an increase in GPS reception strength when the second level is greater than the first level;
  speculatively reading GPS location information from the GPS satellites associated with the portable device in response to the detected second level and the increase of the GPS reception strength and the GPS location information being stale, wherein the reading occurs within a pre-set time interval;
  storing the read GPS location information on the portable device as a function of the cellular radio signal strength received at the portable device such that the read GPS location information is available to the portable device at times when the GPS location information is unavailable for update from the GPS satellites due to the low GPS reception strength at the first level;
  providing a timestamp to the stored GPS location information on the portable device; and
  removing the stored GPS location information after a pre-determined period of time has lapsed with respect to the timestamp.

8. The method of claim 7, further comprising activating a timer if the second level is less than or equal to the first level, wherein the timer deactivates detecting.

9. The method of claim 8, wherein speculatively reading comprises speculatively reading the GPS location information in response to the timer.

* * * * *